US011055337B2

(12) United States Patent
Geduldig et al.

(10) Patent No.: US 11,055,337 B2
(45) Date of Patent: Jul. 6, 2021

(54) CONTEXTUAL IMAGE PRESENTATION

(71) Applicant: Disney Enterprises, Inc., Burbank, CA (US)

(72) Inventors: Jonas Geduldig, Glen Rock, NJ (US); George Veloso, Bridgton, ME (US); Michael J. Strein, Bohemia, NY (US); Terrence Pong, New York, NY (US)

(73) Assignee: Disney Enterprises, Inc., Burbank, CA (US)

( * ) Notice: Subject to any disclaimer, the term of this patent is extended or adjusted under 35 U.S.C. 154(b) by 8 days.

(21) Appl. No.: 16/660,031

(22) Filed: Oct. 22, 2019

(65) Prior Publication Data

US 2020/0050622 A1    Feb. 13, 2020

Related U.S. Application Data

(63) Continuation of application No. 14/932,881, filed on Aug. 21, 2015, now Pat. No. 10,496,690.

(51) Int. Cl.
*G06F 16/35* (2019.01)
*G06F 16/55* (2019.01)
*G06F 16/58* (2019.01)

(52) U.S. Cl.
CPC ............ *G06F 16/355* (2019.01); *G06F 16/55* (2019.01); *G06F 16/58* (2019.01)

(58) Field of Classification Search
CPC ......... G06F 16/55; G06F 16/58; G06F 16/355
See application file for complete search history.

(56) References Cited

U.S. PATENT DOCUMENTS

| 9,460,163 | B1* | 10/2016 | Toal | G06F 16/955 |
| 2007/0250791 | A1* | 10/2007 | Halliday | G06F 16/447 |
| | | | | 715/808 |
| 2012/0047219 | A1* | 2/2012 | Feng | G06F 16/2465 |
| | | | | 709/207 |
| 2014/0052782 | A1* | 2/2014 | Ryan | G06Q 30/02 |
| | | | | 709/204 |
| 2014/0282132 | A1* | 9/2014 | Daly, IV | G06F 3/0484 |
| | | | | 715/763 |
| 2014/0341476 | A1* | 11/2014 | Kulick | G06F 16/51 |
| | | | | 382/224 |

(Continued)

*Primary Examiner* — James Trujillo
*Assistant Examiner* — Michal Bogacki
(74) *Attorney, Agent, or Firm* — Farjami & Farjmai LLP (57) ABSTRACT

There are provided contextual image presentation systems and methods. Such a system includes a hardware processor and a system memory having stored therein a contextual image generator including a data mapping module and a data visualization module. The contextual image generator receives social media data describing social media posts, determines a geographical location corresponding to at least some of the social media posts, and identifies a subject category corresponding respectively to each of the social media posts. In addition, the contextual image generator groups the social media posts into social media collections based on at least one of the subject category and the geographical location corresponding to each social media post. The contextual image generator further generates a contextual image that visually associates at least one of the social media collections with the subject category and/or the geographical location used to group that social media collection.

18 Claims, 7 Drawing Sheets

(56) References Cited

U.S. PATENT DOCUMENTS

| | | | |
|---|---|---|---|
| 2014/0344861 A1* | 11/2014 | Berner | H04N 21/41407 725/46 |
| 2015/0026196 A1* | 1/2015 | Liang | H04L 67/1097 707/748 |
| 2015/0113018 A1* | 4/2015 | Steed | G06F 16/2465 707/776 |
| 2016/0034562 A1* | 2/2016 | Malcolm-Dacosta | H04L 51/12 707/740 |

* cited by examiner

CONTEXTUAL IMAGE PRESENTATION

The present application is a Continuation of U.S. application Ser. No. 14/832,881, filed Aug. 21, 2015, which is hereby incorporated by reference in its entirety into the present application.

BACKGROUND

Social media use continues to grow as established social media communities attract an ever wider membership and as new social media communities arise and are embraced by early adopters. As a result, a typical social media user may access multiple social media platforms, and may engage with multiple virtual communities of friends or contacts that only partially overlap between alternative platforms. Moreover, each platform and each virtual community provides its own stream of communications, such as news feeds, status updates, commentary, and the like, much of which may be substantively redundant between platforms. Consequently, the identification of information that is fresh, popular across one or more virtual communities, and of genuine interest to the social media user, can be a burdensome and sometimes frustrating undertaking, and may detract from the pleasure of social media participation.

SUMMARY

There are provided systems and methods for contextual image presentation, substantially as shown in and/or described in connection with at least one of the figures, and as set forth more completely in the claims.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As disclosed in the present application, a contextual image presentation system includes a contextual image generator having a data mapping module configured to determine geographical locations corresponding respectively to social media posts. That determination can be based on social media data received by the contextual image presentation system, and describing the social media posts. In addition, the contextual image generator is configured to identify one or more subject categories corresponding to each of the social media posts, and to group the social media posts into social media collections based on the subject category or categories and/or the geographical location associated with each social media post.

The contextual image generator also includes a data visualization module configured to generate a contextual image that visually associates one or more of the social media collections with the respective subject category or categories and/or the respective geographical location used to group the one or more social media collections. Moreover, the contextual image generator disclosed in the present application can be configured to update the contextual image based on additional social media data received after generation of the contextual image, and in some implementations may be configured to perform the update substantially in real-time.

Figure 1:
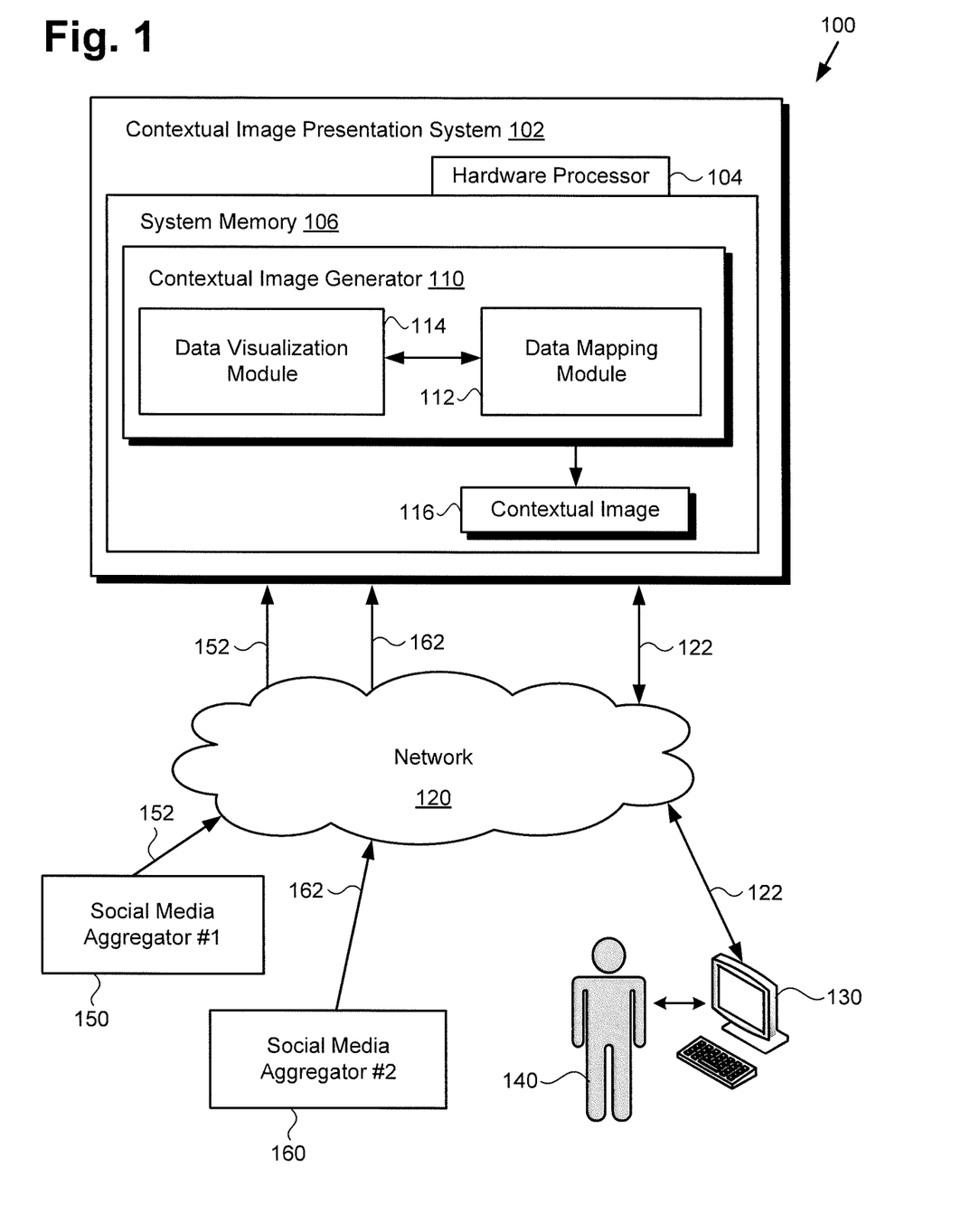
FIG. 1 shows a diagram of an exemplary contextual image presentation system, according to one implementation of the present disclosure.

FIG. 1 shows a diagram of an exemplary contextual image presentation system, according to one implementation. As shown in FIG. 1, contextual image presentation system 102 is situated within communication environment 100 including communication network 120, client system 130, system user 140, first social media aggregator 150, and second social media aggregator 160.

Contextual image presentation system 102 includes hardware processor 104, and system memory 106 storing contextual image generator 110 including data mapping module 112 and data visualization module 114. In addition, system memory 106 is shown to include contextual image 116 generated by contextual image generator 110. Also shown in FIG. 1 are network communication links 122 interactively connecting client system 130 and contextual image presentation system 102 via communication network 120, as well as social media data 152 and social media data 162 received by contextual image presentation system 102 from respective first social media aggregator 150 and second social media aggregator 160 via communication network 120.

According to the implementation shown in FIG. 1, system user 140, who may be a social media user, for example, may utilize client system 130 to interact with contextual image presentation system 102 over communication network 120. For instance, system user 140 may receive contextual image 116 over communication network 120, or may download contextual image generator 110 to client system 130 via communication network 120. In one implementation, contextual image presentation system 102 may correspond to one or more web servers, accessible over a packet network such as the Internet, for example. Alternatively, contextual image presentation system 102 may correspond to one or more servers supporting a local area network (LAN), or included in another type of limited distribution network.

Hardware processor 104 is configured to execute contextual image generator 110 to receive social media data 152 and/or social media data 162 describing social media communications posted to one or more social media platforms (such social media communications hereinafter referred to as "social media posts"). Hardware processor 104 is further configured to execute contextual image generator 110 to use data mapping module 112 to determine a geographical location corresponding to each of at least a subset of the social media posts described by social media data 152 and/or social media data 162.

Hardware processor 104 is also configured to execute contextual image generator 110 to identify one or more subject categories corresponding to each of the social media posts described by social media data 152 and/or social media data 162, and to group the social media posts into social media collections based on the subject category or categories and/or the geographical location associated with each social media post. In addition, hardware processor 104 is configured to execute contextual image generator 110 to use data visualization module 114 to generate contextual image 116 that visually associates one or more of the social media collections with the respective subject category or categories and/or the respective geographical location used to group the social media collection or collections.

In some implementations, hardware processor 104 is configured to execute contextual image generator 110 to display contextual image 116 to system user 140, through display features available on client system 130, for example. In some implementations, hardware processor 104 is configured to execute contextual image generator 110 to update or otherwise modify contextual image 116 based on additional social media data received from one or more of first social media aggregator 150 and second social media aggregator 160 after generation of contextual image 116. Moreover, in some implementations, hardware processor 104 is configured to execute contextual image generator 110 to update or modify contextual image 116 based on the additional social media data received from one or more of first social media aggregator 150 and second social media aggregator 160 substantially in real-time.

It is noted that although FIG. 1 depicts contextual image 116 as residing in system memory 106, in some implementations, contextual image 116 may be copied to non-volatile storage (not shown in FIG. 1), or may be transmitted to client system 130 via communication network 120 as mentioned above. It is further noted that although client system 130 is shown as a personal computer (PC) in FIG. 1, that representation is provided merely as an example. In other implementations, client system 130 may be a mobile communication device, such as a smartphone or tablet computer, for example.

Figure 2:
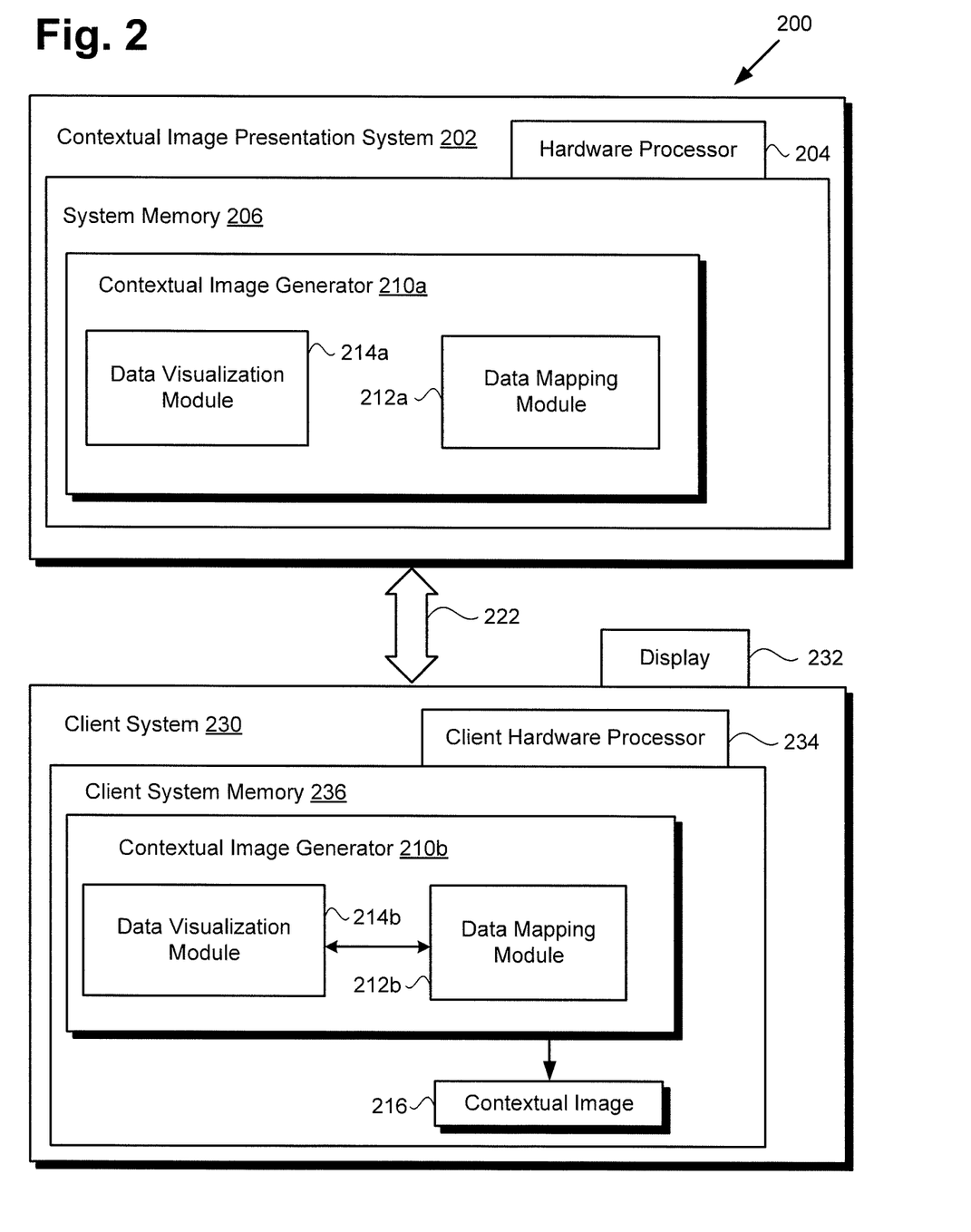
FIG. 2 shows another exemplary implementation of a contextual image presentation system.

Referring to FIG. 2, FIG. 2 shows a more detailed exemplary implementation of client system 230, which may itself be configured to perform contextual image presentation. Communication environment 200 in FIG. 2 includes client system 230 interactively connected to contextual image presentation system 202 over network communication link 222. As shown in FIG. 2, contextual image presentation system 202 includes hardware processor 204, and system memory 206 storing contextual image generator 210a including data mapping module 212a and data visualization module 214a. As further shown in FIG. 2, client system 230 includes display 232, client hardware processor 234, and client system memory 236 storing contextual image generator 210b including data mapping module 212b and data visualization module 214b. Also shown in FIG. 2 are contextual image 216 generated by contextual image generator 210b on client system 230.

Network communication link 222, and contextual image presentation system 202 including hardware processor 204 and system memory 206 correspond in general to network communication link 122, and contextual image presentation system 102 including hardware processor 104 and system memory 106, in FIG. 1. In addition, contextual image generator 210a including data mapping module 212a and data visualization module 214a, in FIG. 2, corresponds to contextual image generator 110 including data mapping module 112 and data visualization module 114, in FIG. 1. In other words, contextual image generator 210a, data mapping module 212a, and data visualization module 214a may share any of the characteristics attributed to corresponding contextual image generator 110, data mapping module 112, and data visualization module 114 shown in FIG. 1 and described above.

Client system 230 corresponds in general to client system 130, in FIG. 1. Moreover, contextual image generator 210b including data mapping module 212b and data visualization module 214b corresponds to contextual image generator 110/210b including data mapping module 112/212b and data visualization module 114/214b. As a result, contextual image generator 210b, data mapping module 212b, and data visualization module 214b may share any of the characteristics attributed to corresponding contextual image generator 110, data mapping module 112, and data visualization module 114 shown in FIG. 1 and described above.

According to the exemplary implementation shown in FIG. 2, contextual image generator 210b including data mapping module 212b and data visualization module 214b is located in client system memory 236, having been received from contextual image presentation system 202 via network communication link 222. In one implementation, network communication link 222 corresponds to transfer of contextual image generator 210b including data mapping module 212b and data visualization module 214b over a packet network, for example. Once transferred, for instance by being downloaded over network communication link 222, contextual image generator 210b including data mapping module 212b and data visualization module 214b may be persistently stored in client system memory 236 and may be executed locally on client system 230 by client hardware processor 234.

Client hardware processor 234 may be the central processing unit (CPU) for client system 230, for example, in which role client hardware processor 234 runs the operating system for client system 230 and executes contextual image generator 210b. In the exemplary implementation of FIG. 2, a user of client system 230, such as system user 140, in FIG. 1, can utilize contextual image generator 210b on client system 230 to generate contextual image 216, which corresponds in general to contextual image 116, and to display contextual image 216 on display 232. Display 232 may take the form of a liquid crystal display (LCD), a light-emitting diode (LED) display, an organic light-emitting diode (OLED) display, or another suitable display screen that performs a physical transformation of signals to light so as to display contextual image 216 to a system user, such as system user 140, in FIG. 1.

Figure 3:
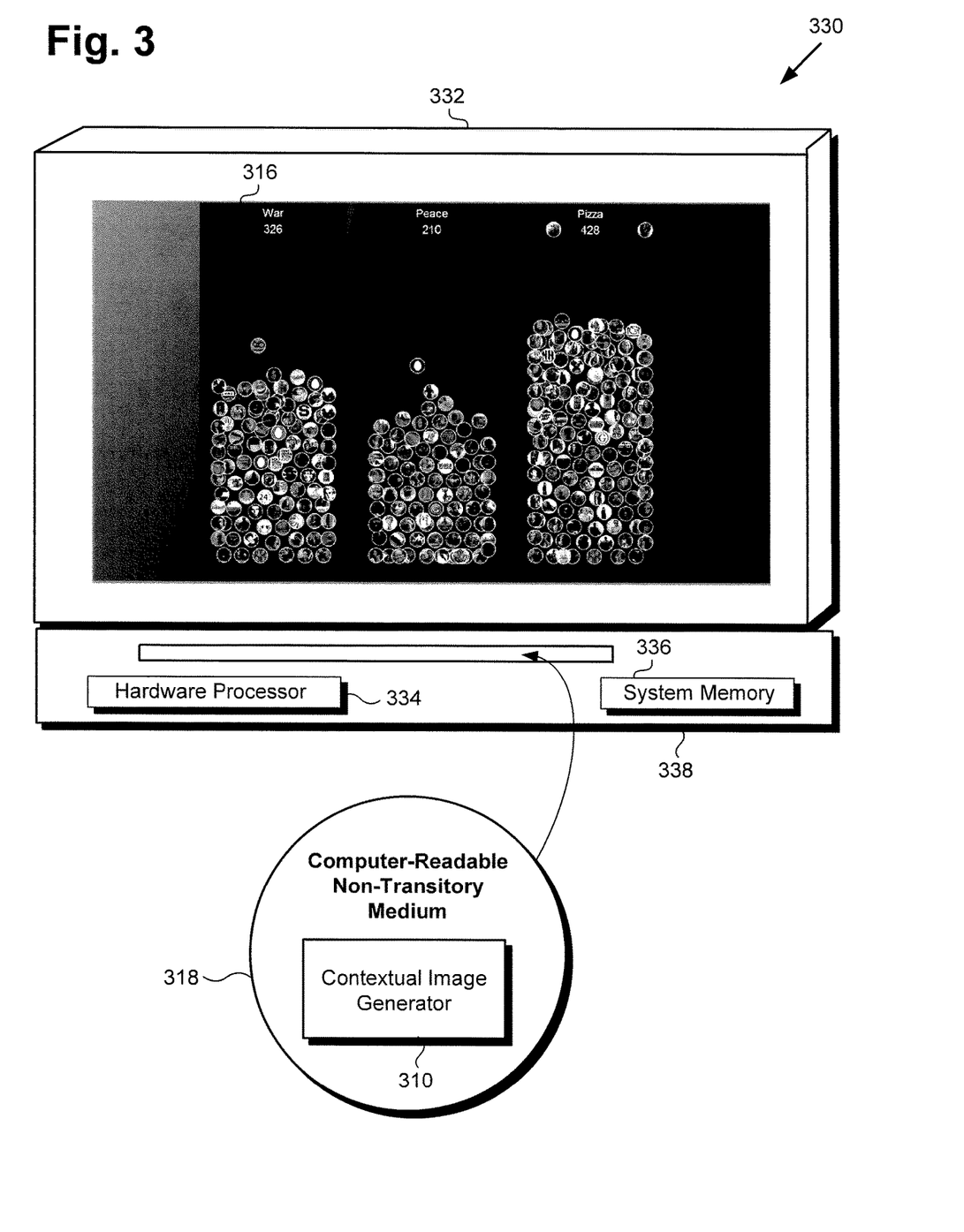
FIG. 3 shows an exemplary system and a computer-readable non-transitory medium including instructions for performing contextual image presentation, according to one implementation.

Moving now to FIG. 3, FIG. 3 shows an exemplary system and a computer-readable non-transitory medium including instructions enabling performance of contextual image presentation, according to one implementation. System 330 includes computer 338 having hardware processor 334 and system memory 336, interactively linked to display 332. Like display 232, in FIG. 2, display 332 may take the form of an LCD, LED, or OLED display, for example, configured to perform a physical transformation of signals to light so as to display contextual image 316 to a system user.

System 330 including hardware processor 334 and system memory 336 corresponds in general to any or all of contextual image presentation system 102 and client system 130, in FIG. 1, and contextual image presentation system 202 and client system 230, in FIG. 2. In addition, contextual image 316 corresponds in general to contextual image 116/216 in FIG. 1/2.

Also shown in FIG. 3 is computer-readable non-transitory medium 318 having contextual image generator 310 stored thereon. The expression "computer-readable non-transitory medium," as used in the present application, refers to any medium, excluding a carrier wave or other transitory signal, that provides instructions to hardware processor 334 of computer 338. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

According to the implementation shown in FIG. 3, computer-readable non-transitory medium 318 provides contextual image generator 310 for execution by hardware processor 334 of computer 338. Contextual image generator 310, when executed by hardware processor 334, instantiates a contextual image generator corresponding to contextual image generator 110/210a/210b, in FIG. 1/2, and capable of performing all of the operations attributed to those corresponding features by the present disclosure. For example, contextual image generator 310, when executed by hardware processor 334, is configured to generate and display contextual image 316 on display 332 of system 300.

Figure 4:
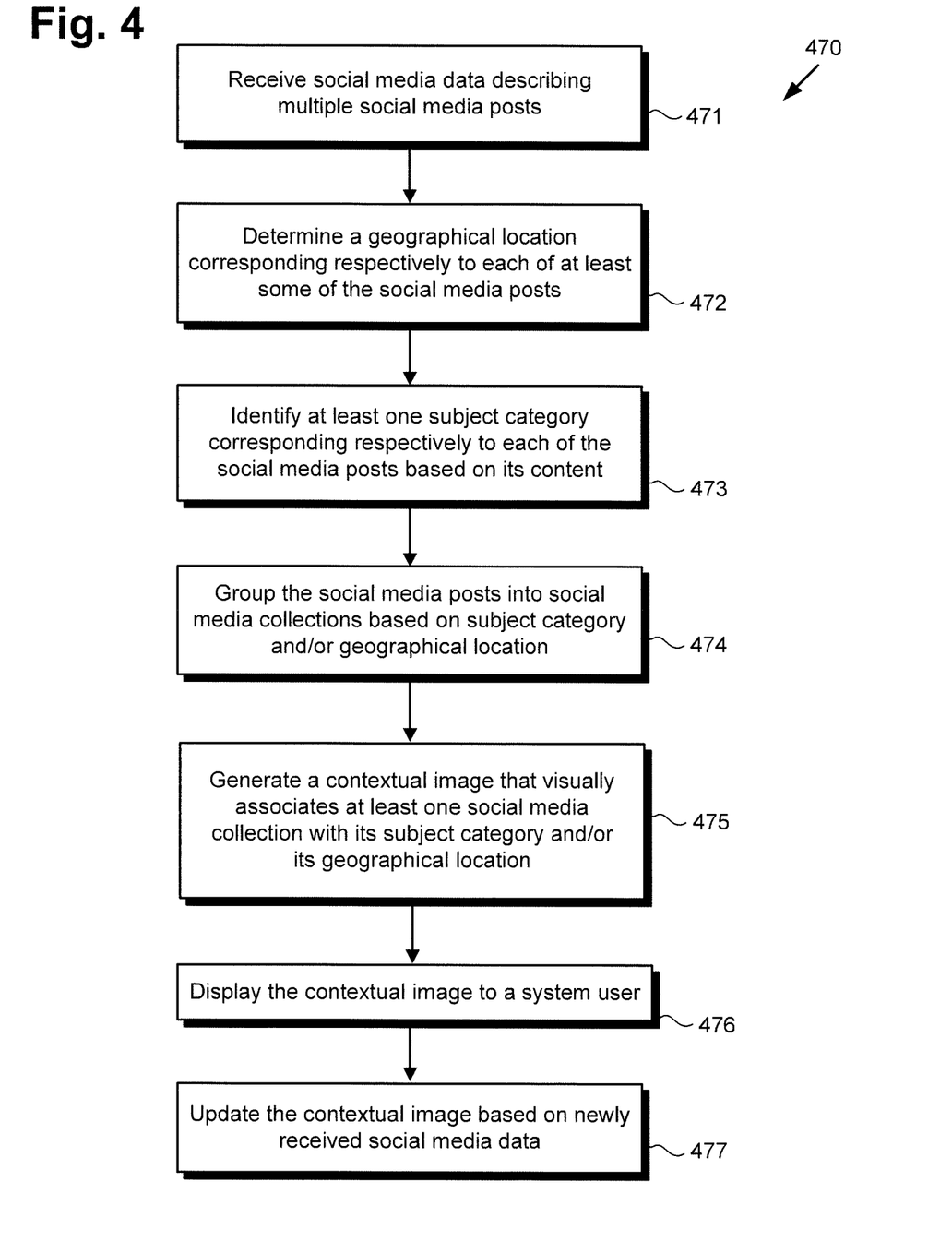
FIG. 4 is a flowchart presenting an exemplary method for use by a contextual image presentation system, according to one implementation.

The systems suitable for use as contextual image presentation systems and discussed above by reference to FIGS. 1, 2, and 3, will be further described below with reference to FIG. 4. FIG. 4 presents flowchart 400 outlining an exemplary method for use by a contextual image presentation system.

Flowchart 400 begins with receiving social media data 152 and/or social media data 162 describing multiple social media posts (action 471). Social media data 152 and/or social media data 162 may be received by contextual image generator 110/210a/210b/310 of system 102/202/230/330, executed by respective hardware processor 104/204/234/334. As shown in FIG. 1, social media data 152 and/or social media data 162 may be received by contextual image generator 110/210a/210b/310 from respective first social media aggregator 150 and/or second social media aggregator 160, via communication network 120.

By way of example, social media data 152 and/or social media data 162 may be received from respective first social media aggregator 150 and/or second social media aggregator in the form of data corresponding to user posts on social media platforms such as Twitter™, Facebook™, and Instagram™, among others. Social media data 152 and/or social media data 162 may include information such as public user profile information about the social media user providing a particular post, the time zone from which the post originated, text contained in the post, and metadata describing the post and/or its attachments, such as a photo or video.

Flowchart 400 continues with determining a geographical location corresponding respectively to each of at least some of the social media posts (action 472). Determination of the geographical location corresponding to some or substantially all of the social media posts may be performed by contextual image generator 110/210a/210b/310 of system 102/202/230/330, executed by respective hardware processor 104/204/234/334, and using data mapping module 112/212a/212b.

In some instances, social media data 152 and/or social media data 162 may expressly identify a geographical location corresponding to a social media post, such as its geographical point of origin. For example, the text contained in a social media post, or Global Positioning System (GPS) data included as metadata with a photograph or video captured using a Smartphone and included with the social media post may enable direct determination of the geographical point of origin of the social media post. It is noted that the expression "geographical point of origin", as used herein, is interpreted broadly to refer to geographical locales and regions, in addition to more specific locations or points. Thus, the geographical point of origin of a social media post may refer to the immediate geographical vicinity from which the social media post originated, or the city, county, state, country, or national or global region from which the social media post originated.

In many instances, however, a geographical location corresponding to a particular social media post may not be expressly identified by social media data 152 and/or social media data 162. In those cases, hardware processor 104/204/234/334 may be configured to execute contextual image generator 110/210a/210b/310 to use data mapping module 112/212a/212b to determine a geographical location corresponding to the social media post inferentially.

For example, although failing to expressly identify a geographical point of origin for a particular social media post, social media data 152 and/or social media data 162 may include information about the time zone from which the social media post originated. In addition, social media data 152 and/or social media data 162 may include content of the social media post describing an address or business name, such as a restaurant or entertainment venue. In those instances, contextual image generator 110/210a/210b/310 may be configured to use data mapping module 112/212a/212b to infer the geographical point of origin of the social media post. As a specific example, a social media post identified as originating from the U.S. Pacific time zone and describing Red Rock Canyon and Binion's Steakhouse™ may be inferentially determined to originate from Las Vegas, Nev.

It is noted that in some implementations, social media data 152 and/or social media data 162 may not include sufficient information to determine a geographical location corresponding to each and every social media post described by social media data 152 and/or social media data 162. However, in other implementations, use of inferential as well as express determination of geographical location may enable contextual image generator 110/210a/210b/310 to use data mapping module 112/212a/212b to determine a geographical location corresponding to substantially all of the social media post described by social media data 152 and/or social media data 162.

Flowchart 400 continues with identifying one or more subject categories corresponding respectively to each of the social media posts (action 473). Identification of a subject category or subject categories corresponding respectively to each of the social media posts may be performed by contextual image generator 110/210a/210b/310, executed by respective hardware processor 104/204/234/334. In some implementation, for example, identification of a subject category or subject categories corresponding to each of the social media posts may be performed based on the content of each of the social media posts, as described by social media data 152 and/or social media data 162, for example.

Subject categories may be broad, referring, for example, to large groups of persons, or may be narrow, referring to an individual celebrity or person of some renown. Examples of such subject categories may include food, politics, health, sports, and weather or climate, to name a few. For example, a social media post describing an outing to a favorite pizza restaurant might be identified as corresponding to the subject categories "food," "pizza," and "dining out."

Flowchart 400 continues with grouping the social media posts into social media collections based on subject category and/or geographical location (action 474). Grouping of the social media posts into social media collections based on subject category and/or geographical location may be performed by contextual image generator 110/210a/210b/310, executed by respective hardware processor 104/204/234/334. As a specific example, all social media posts referring to pizza may be grouped into a social media collection labeled "pizza," while those social media posts referring to armed conflict may be grouped into a social media collection labeled "war." As another example, all social media posts originating from Japan and referring to origami could be grouped into social media collection and appropriately labeled.

Flowchart 400 continues with generating contextual image 116/216/316 that visually associates one or more of the social media collections with its subject category and/or its geographical location (action 475). Generation of contextual image 116/216/316 can be performed by contextual image generator 110/210a/210b/310, executed by respective hardware processor 104/204/234/334, and using data visualization module 114/214a/214b.

Figure 5:
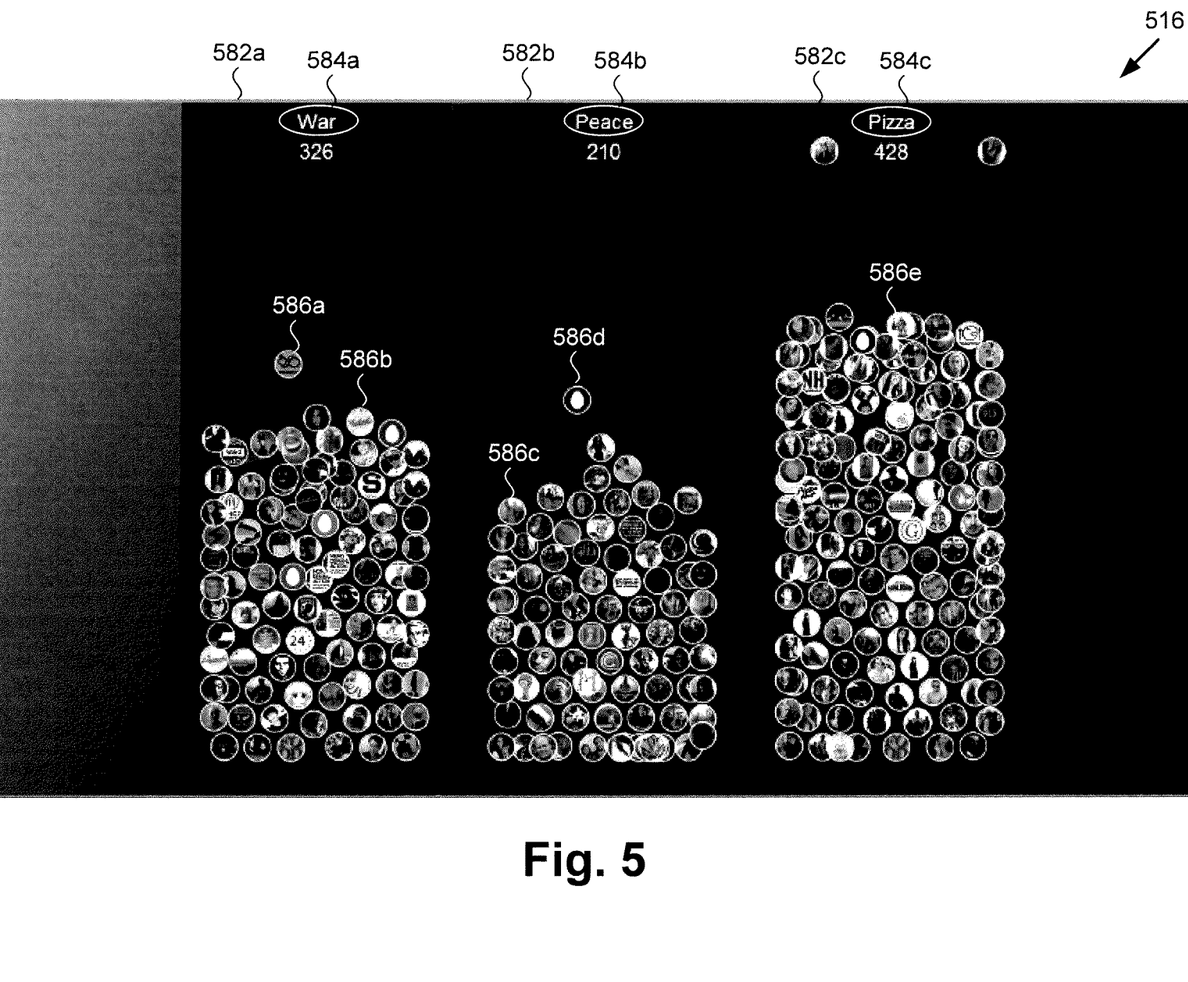
FIG. 5 shows one exemplary representation of a contextual image generated based on the concepts described in the present disclosure.
Figure 6:
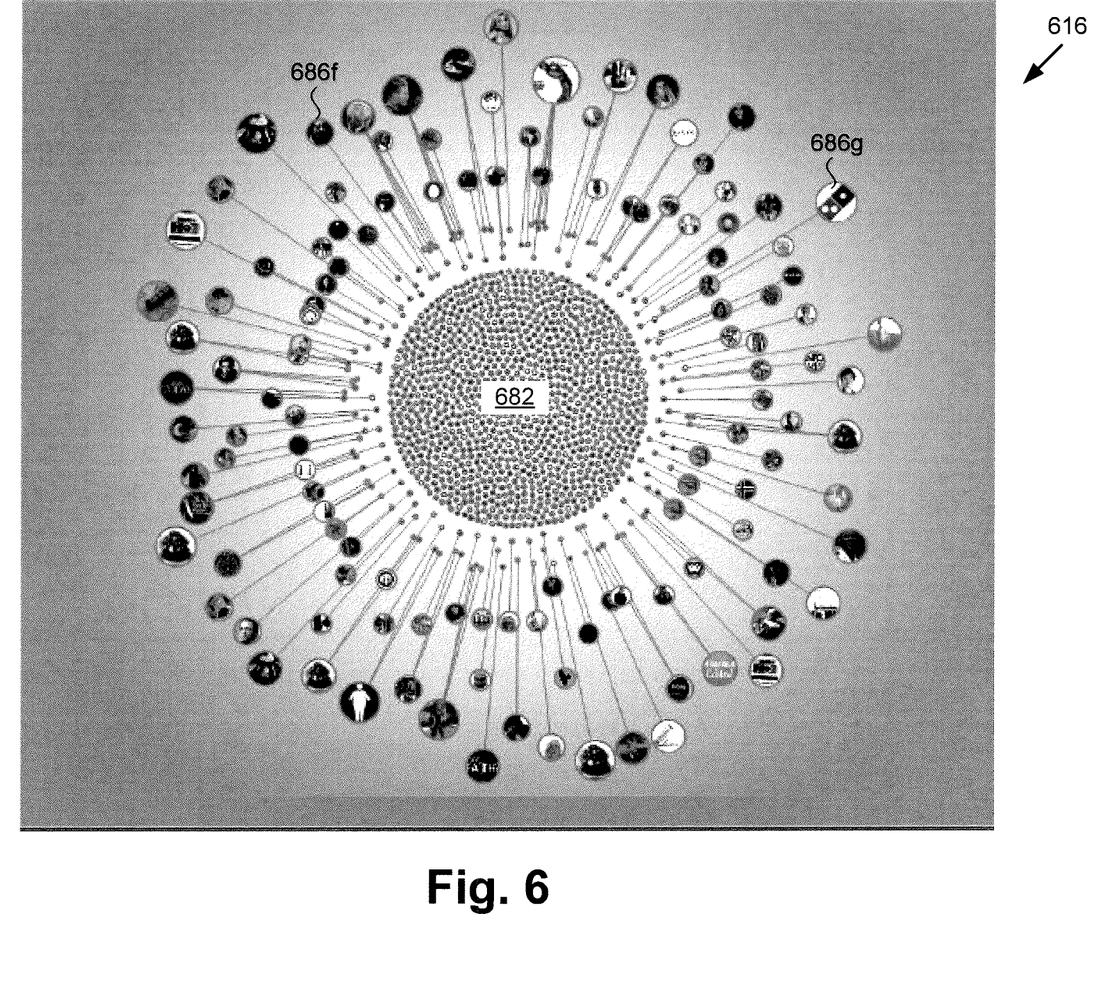
FIG. 6 shows another exemplary representation of a contextual image generated based on the concepts described in the present disclosure.
Figure 7:
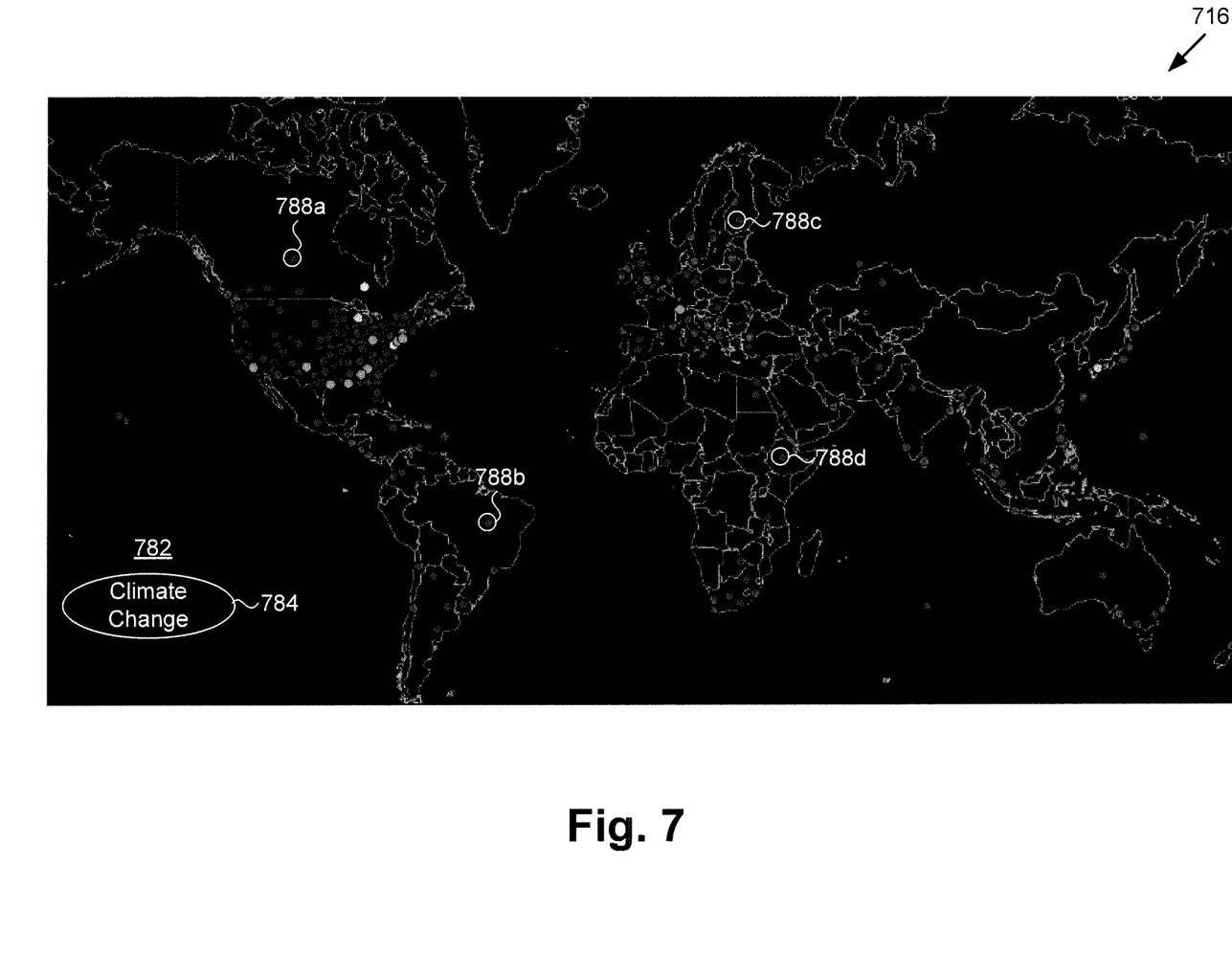
FIG. 7 shows yet another exemplary representation of a contextual image generated based on the concepts described in the present disclosure.

Referring to FIGS. 5, 6, and 7, each of FIGS. 5, 6, and 7 shows an exemplary representation of a contextual image generated based on the concepts described in the present disclosure. FIG. 5 shows contextual image 516 visually associating social media collections 582a, 582b, and 582c with their respective subject categories. Contextual image 516 corresponds in general to contextual image 116/216/316 in FIG. 1/2/3 and may share any of the characteristics attributed to that corresponding feature, above.

As shown in FIG. 5, social media collection 582a is grouped based on its subject category "war" 584a, and includes three hundred and twenty-six (326) social media posts, each represented by an iconic visual representation. For example, iconic visual representations 586a and 586b are used to depict two specific social media posts included in social media collection 582a. It is noted that iconic visual representations 586a and 586b may be reduced scale public profile images adopted by the users posting the respective social media posts corresponding to iconic visual representations 586a and 586b, such as their respective Facebook™ profile pictures or cover photos, for example.

Contextual image 516 also includes social media collection 582b grouped based on its subject category "peace" 584b, and including 210 social media posts, each represented by an iconic visual representation. For example, iconic visual representations 586c and 586d are used to depict two specific social media posts included in social media collection 582b. Contextual image 516 further includes social media collection 582c grouped based on its subject category "pizza" 584c, and including 428 social media posts represented by iconic visual representations including iconic visual representation 586e. As is apparent from contextual image 516, more social media users are posting about pizza then about war or peace.

Continuing to FIG. 6, in some implementations, hardware processor 104/204/234/334 may be configured to execute contextual image generator 110/210a/210b/310 to generate contextual image 616 based on how many times each social media post is shared by a community of social media users, i.e., a community of system users corresponding to system user 140. Contextual image 616 corresponds in general to contextual image 116/216/316/516 in FIG. 1/2/3/5 and may share any of the characteristics attributed to that corresponding feature, above. Moreover, contextual image 616 includes iconic visual representations 686f and 686g, for example, which correspond respectively in general to any of iconic visual representations 586a, 586b, 586c, 586d, and 586e (hereinafter "iconic visual representations 586a-586e"), in FIG. 5. In other words, iconic visual representations 686f and 686g may share any of the characteristics attributed to iconic visual representations 586a-586e, above.

As shown in FIG. 6, all social media posts grouped into social media collection 682 are depicted by contextual image 616. However, the size or visual impact of the iconic visual representations corresponding to each social media post varies according to the number of times that social media post has been shared. For example the social media post corresponding to iconic visual representation 686g has been shared, such as by having been forwarded to other social media users or having been reposted, for example, more often than the social media post corresponding to iconic visual representation 686f, despite both social media posts sharing a common subject category. Furthermore, both of the social media posts corresponding to iconic visual representations 686f and 686g have been shared more often than the social media posts corresponding to the tiny iconic visual representations clustered in the center of contextual image 616, which may not have been shared at all. Thus contextual image 616 visually conveys the relative importance or popularity of each of the social media posts grouped into social media collection 682.

Referring to FIG. 7, FIG. 7 shows contextual image 716 visually associating social media posts grouped into social media collection 782 having subject category "climate change" 784 with the geographical locations from which the social media posts originate. Contextual image 716 corresponds in general to contextual image 116/216/316/516/616 in FIG. 1/2/3/5/6 and may share any of the characteristics attributed to that corresponding feature, above. As shown by visual representations 788a, 788b, 788c, and 788d, included in contextual image 716, social media users in North America, South America, Europe, and Africa have posted regarding climate change on social media.

Referring back to FIG. 4, flowchart 400 continues with displaying contextual image 116/216/316/516/616/716 to system user 140 (action 476). Display of contextual image 116/216/316/516/616/716 to system user 140 can be performed by contextual image generator 110/210a/210b/310 of system 102/202/230/330, executed by respective hardware processor 104/204/234/334. For example, and as discussed above, contextual image 116/216 may be displayed using display features of client system 130/230, such as display 232, while contextual image 316 may be displayed using display 332 of system 330.

As shown in FIG. 4, flowchart 400 may conclude with updating contextual image 116/216/316/516/616/716 based on newly received social media data (action 477). That is to say, hardware processor 104/204/234/334 may be configured to execute contextual image generator 110/210a/210b/

310 to update contextual image 116/216/316/516/616/716 after the generation (action 476) of contextual image 116/216/316/516/616/716. Moreover, in some implementations, hardware processor 104/204/234/334 may be configured to execute contextual image generator 110/210a/210b/310 to update contextual image 116/216/316/516/616/716 in real-time.

As a result, contextual image 116/216/316/516/616/716 may be presented as a dynamic real-time visual representation of social media posts based on the subject matter and/or the geographical origin of those posts, thereby enhancing enjoyment of social media participation.

The contextual image presentation systems and methods disclosed in the present application can be utilized to enhance user enjoyment of social media in many ways. For example, the present systems and methods may be utilized by a social media user to gather the user's photos from various social media platforms such as Twitter™, Facebook™, Instagram™, and the like, and display those photos collectively by topic. In addition, the present systems and methods may be utilized by a social media user to display the user's travels, for example during a vacation or business trip, by tracing through the history of the user's posts. Such an approach could be used to follow a reporter as they travel around the globe, an ambassador negotiating a peace treaty, or an average social media user during their travels. The visual display enabled according to the present solution for presenting contextual images is more compelling than simple statistics of the trip.

The contextual image presentation systems and methods disclosed in the present application may be implemented so as to depict election data, viewing trends, demographics, sports information, to name a few examples, geographically, or according to other desirable criteria. Moreover, in addition to enhancing the enjoyment of a single social media user, the systems and methods disclosed in the present application may be implemented to inform and/or entertain a group or audience. For example, the contextual images presented using the systems and according to the methods disclosed herein may be presented as part of a television (TV) news or entertainment segment, or may be displayed in a kiosk as part of a museum exhibit or theme park attraction. It is noted that FIGS. 5, 6, and 7 of the present application, which are discussed above, present additional specific examples of contextual images generated based on the concepts described in the present disclosure.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A contextual image presentation system comprising:
a hardware processor and a system memory having stored therein a contextual image generator, wherein the hardware processor is configured to execute the contextual image generator to:
receive social media data describing social media posts;
identify a plurality of subject categories each corresponding respectively to at least one of the social media posts;
group the social media posts into social media collections based on a respective one of the plurality of subject categories corresponding to each of the social media posts;
generate a contextual image that visually associates at least one of the social media collections with the respective one of the plurality of subject categories used to group the at least one of the social media collections, wherein the contextual image labels the respective one of the plurality of subject categories, wherein the contextual image represents each of the social media posts in the at least one of the social media collections by a visual representation, and wherein a position of the visual representation is based on a number of times a corresponding social media post has been shared; and
display the contextual image to a system user.

2. The contextual image presentation system of claim 1, wherein the hardware processor is further configured to execute the contextual image generator to update the contextual image based on additional social media data received after generation of the contextual image.

3. The contextual image presentation system of claim 2, wherein the hardware processor is configured to execute the contextual image generator to update the contextual image substantially in real-time.

4. The contextual image presentation system of claim 1, wherein the hardware processor is configured to execute the contextual image generator to identify the plurality of subject categories corresponding respectively to each of the social media posts based on a content of each of the social media posts.

5. The contextual image presentation system of claim 1, wherein the hardware processor is further configured to execute the contextual image generator to:
determine a geographical location corresponding respectively to each of at least a subset of the social media posts; and
group the subset of the social media posts into the social media collections based on the respective one of the plurality of subject categories and the respective geographical location corresponding to each of the social media posts;
wherein the contextual image visually associates the at least one of the social media collections with the respective geographical location used to group the at least one of the social media collections.

6. The contextual image presentation system of claim 5, wherein the hardware processor is configured to execute the contextual image generator to determine the geographical location corresponding respectively to each social media post of the at least the subset of the social media posts inferentially, based on a time zone corresponding to each social media post of the at least the subset of the social media posts and another location identified in each social media post of the at least the subset of the social media posts.

7. The contextual image presentation system of claim 1, wherein the hardware processor is further configured to execute the contextual image generator to vary a size of each image representing a corresponding one of a plurality of users posting the social media posts according to a number of times a corresponding social media post of each of the plurality of users has been shared.

8. The contextual image presentation system of claim 1, wherein the hardware processor is further configured to execute the contextual image generator to vary a visual impact of each image representing a corresponding one of a plurality of users posting the social media posts according to a number of times a corresponding social media post of each of the plurality of users has been shared.

9. A method for use by a contextual image presentation system including a hardware processor and a system memory having a contextual image generator stored therein, the method comprising:
- receiving, using the hardware processor, social media data describing social media posts;
- identifying, using the hardware processor, a plurality of subject categories each corresponding respectively to at least one of the social media posts;
- grouping, using the hardware processor, the social media posts into social media collections based on a respective one of the plurality of subject categories corresponding to each of the social media posts;
- generating, using the hardware processor, a contextual image that visually associates at least one of the social media collections with the respective one of the plurality of subject categories used to group the at least one of the social media collections, wherein the contextual image labels the respective one of the plurality of subject categories, wherein the contextual image represents each of the social media posts in the at least one of the social media collections by a visual representation, and wherein a position of the visual representation is based on a number of times a corresponding social media post has been shared; and
- displaying, using the hardware processor, the contextual image to a system user.

10. The method of claim 9 further comprising:
updating the contextual image based on additional social media data received after generation of the contextual image.

11. The method of claim 10 further comprising:
updating the contextual image substantially in real-time.

12. The method of claim 9 further comprising:
identifying the plurality of subject categories corresponding respectively to each of the social media posts based on a content of each of the social media posts.

13. The method of claim 9 further comprising:
- determining a geographical location corresponding respectively to each of at least a subset of the social media posts; and
- grouping the subset of the social media posts into the social media collections based on the respective one of the plurality of subject categories and the respective geographical location corresponding to each of the social media posts;
- wherein the contextual image visually associates the at least one of the social media collections with the respective geographical location used to group the at least one of the social media collections.

14. The method of claim 13 further comprising:
determining the geographical location corresponding respectively to each social media post of the at least the subset of the social media posts inferentially, based on a time zone corresponding to each social media post of the at least the subset of the social media posts and another location identified in each social media post of the at least the subset of the social media posts.

15. The method of claim 9 further comprising:
varying a size of each image representing a corresponding one of a plurality of users posting the social media posts according to a number of times a corresponding social media post of each of the plurality of users has been shared.

16. The method of claim 9 further comprising:
varying a visual impact of each image representing a corresponding one of a plurality of users posting the social media posts according to a number of times a corresponding social media post of each of the plurality of users has been shared.

17. The contextual image presentation system of claim 1, wherein the visual representation is an iconic visual representation.

18. The method of claim 9, wherein the visual representation is an iconic visual representation.

* * * * *

UNITED STATES PATENT AND TRADEMARK OFFICE
CERTIFICATE OF CORRECTION

Page 1 of 1

PATENT NO. : 11,055,337 B2
APPLICATION NO. : 16/660031
DATED : July 6, 2021
INVENTOR(S) : Geduldig et al.

It is certified that error appears in the above-identified patent and that said Letters Patent is hereby corrected as shown below:

On the Title Page

In Related U.S. Application Data, "(63) Continuation of application No. 14/932,881, filed on" should be --(63) Continuation of application No. 14/832,881, filed on--.

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*